US012695489B2

(12) United States Patent
Wu et al.

(10) Patent No.: US 12,695,489 B2
(45) Date of Patent: Jul. 28, 2026

(54) MULTI-BEAM LIQUID CRYSTAL ANTENNA AND METHOD OF MULTI-BEAMFORMING

(71) Applicant: AUO Corporation, Hsin-Chu (TW)

(72) Inventors: Chun-I Wu, Hsin-Chu (TW);
Yi-Hsiang Lai, Hsin-Chu (TW);
Yi-Chen Hsieh, Hsin-Chu (TW);
Chuang-Yueh Lin, Hsin-Chu (TW);
Ching-Huan Lin, Hsin-Chu (TW)

(73) Assignee: AUO CORPORATION, Hsin-Chu (TW)

( * ) Notice: Subject to any disclaimer, the term of this patent is extended or adjusted under 35 U.S.C. 154(b) by 191 days.

(21) Appl. No.: 18/391,739

(22) Filed: Dec. 21, 2023

(65) Prior Publication Data

US 2025/0125845 A1 Apr. 17, 2025

(30) Foreign Application Priority Data

Oct. 13, 2023 (TW) .................................. 112139240

(51) Int. Cl.
| | |
|---|---|
| *H04B 7/06* | (2006.01) |
| *H01Q 3/44* | (2006.01) |
| *H01Q 9/04* | (2006.01) |

(52) U.S. Cl.
CPC ............. *H04B 7/0617* (2013.01); *H01Q 3/44* (2013.01); *H01Q 9/0407* (2013.01)

(58) Field of Classification Search
CPC .......... H04B 7/0617; H01Q 3/44; H01Q 3/26; H01Q 21/065; H01Q 9/0407; H01Q 1/48;
(Continued)

(56) References Cited

U.S. PATENT DOCUMENTS

| | | | |
|---|---|---|---|
| 2020/0194888 A1 | 6/2020 | Liu | |
| 2022/0216621 A1* | 7/2022 | Chen | ........................ H01Q 1/38 |

FOREIGN PATENT DOCUMENTS

| | | | | |
|---|---|---|---|---|
| CN | 108736168 A | * | 11/2018 | ......... H01Q 15/0086 |
| CN | 115207630 A | * | 10/2022 | ............. H01Q 15/14 |

(Continued)

OTHER PUBLICATIONS

WO-2023092305-A1 Translation (Year: 2023).*

(Continued)

*Primary Examiner* — Dameon E Levi
*Assistant Examiner* — Gurbir Singh
(74) *Attorney, Agent, or Firm* — WPAT, PC

(57) ABSTRACT

A multi-beam liquid crystal antenna and a method of multi-beamforming are provided. The method includes: providing a liquid crystal modulation structure; utilizing a feeding structure to receive a feeding signal and to generate substantially an equiphase feeding electromagnetic wave to patch antenna units of the liquid crystal modulation structure; generating, by the patch antenna units, first radiation intensities and second radiation intensities respectively when the patch antenna units are utilized to receive alternating-current (AC) voltages respectively, so that the liquid crystal modulation structure forms an amplitude interference pattern; and utilizing interference of the feeding electromagnetic wave and the amplitude interference pattern to form electromagnetic beams, in which arrangement positions of the first radiation intensities and the second radiation intensities corresponding to the amplitude interference pattern change an azimuth angle and a tilt angle of each of the electromagnetic beams.

13 Claims, 15 Drawing Sheets

(58) Field of Classification Search
      CPC .......... H01Q 1/50; H01Q 9/045; H01Q 25/00;
               H01Q 3/36; H01Q 15/0086; H01Q 1/38;
               H01Q 3/34; H01Q 3/46; H01Q 15/0006
      See application file for complete search history.

(56) References Cited

FOREIGN PATENT DOCUMENTS

| | | | | | |
|---|---|---|---|---|---|
| CN | 115396073 | A | 11/2022 | | |
| CN | 116799506 | A | 9/2023 | | |
| WO | WO-2021047245 | A1 * | 3/2021 | ............. | G01S 7/027 |
| WO | WO-2023092305 | A1 * | 6/2023 | .............. | H01Q 3/36 |

OTHER PUBLICATIONS

WO 2021047245A1 Translation (Year: 2021).*
CN-115207630-A Translation (Year: 2022).*
CN-108736168-A Translation (Year: 2018).*
WO-2021047245-A1 (Year: 2021).*
WO-2023092305-A1 (Year: 2023).*

* cited by examiner

MULTI-BEAM LIQUID CRYSTAL ANTENNA AND METHOD OF MULTI-BEAMFORMING

RELATED APPLICATIONS

This application claims priority to Taiwan Application Serial Number 112139240, filed Oct. 13, 2023, which is herein incorporated by reference.

BACKGROUND

Technical Field

The present disclosure relates to a liquid crystal antenna and a method of beamforming, and particularly relates to a multi-beam liquid crystal antenna capable of radiating multiple beams and a method of multi-beamforming.

Description of Related Art

Current manners of monitoring human physiological information can be roughly divided into contact methods or non-contact methods. The contact methods usually involve invading the human body to obtain physiological information. Some non-contact methods will use optical sensing, such as cameras with red or green light, to obtain human physiological information. Since contact devices need to contact or invade the human body, a tested person may feel uncomfortable. When optical sensing is used, the camera, sometimes, will capture face information of the tested person, which results in derivational privacy issues.

In addition to the above methods, radar systems using single-beam electromagnetic wave scanning have been developed to detect human physiological information, but when the single-beam electromagnetic wave scanning is used, the detection time is long, and anomalies often cannot be immediately detected when the scanning space is large.

SUMMARY

At least one embodiment of the present disclosure provides a multi-beam liquid crystal antenna capable of radiating electromagnetic beams that can shorten the scanning time and the detection time.

The multi-beam liquid crystal antenna includes a liquid crystal modulation structure and a feeding structure. The liquid crystal modulation structure includes a ground plane, patch antenna units and a liquid crystal layer. The ground plane is spaced apart from the patch antenna units, and the liquid crystal layer is disposed between the ground plane and the patch antenna units. At least two of the patch antenna units each generate a first radiation intensity while at least another two of the patch antenna units each generate a second radiation intensity. The liquid crystal modulation structure has a phase difference of 135-225 degrees between an electric field radiation in each of the first radiation intensities and an electric field radiation in each of the second radiation intensities. A feeding structure is configured to receive a feeding signal and to generate substantially an equiphase feeding electromagnetic wave to the patch antenna units. When the patch antenna units generate the first radiation intensities and the second radiation intensities respectively, the liquid crystal modulation structure forms an amplitude interference pattern. The feeding electromagnetic wave interferes with the amplitude interference pattern to form electromagnetic beams, where an angle difference between two azimuth angles of two of the electromagnetic beams is 135-225 degrees. Arrangement positions of the first radiation intensities and the second radiation intensities corresponding to the amplitude interference pattern change the azimuth angle and a tilt angle of each of the electromagnetic beams.

In at least one embodiment of the present disclosure, the amplitude interference pattern shows at least one first zone and at least one second zone, where adjacent ones of the first radiation intensities are distributed in one of the at least one first zone, adjacent ones of the second radiation intensities are distributed in one of the at least one second zone, and the at least one first zone and the at least one second zone are arranged in at least one arrangement direction.

In at least one embodiment of the present disclosure, each of the electromagnetic beams has a beam axis. The beam axes are perpendicular to the at least one arrangement direction at the liquid crystal modulation structure.

In at least one embodiment of the present disclosure, when the amplitude interference pattern shows first zones, a distance between adjacent two of the first zones is a zone spacing. The tilt angle of each of the electromagnetic beams is inversely proportional to the zone spacing.

In at least one embodiment of the present disclosure, when the amplitude interference pattern shows second zones, a distance between adjacent two of the second zones is the zone spacing.

In at least one embodiment of the present disclosure, each of the patch antenna units generates one of the first radiation intensity, the second radiation intensity and a third radiation intensity. An amplitude of an electric field radiation in the third radiation intensity is substantially zero. The patch antenna units generate the first radiation intensities, the second radiation intensities and at least one third radiation intensity respectively. A zone in which the at least one third radiation intensity is distributed is adjacent to at least one of a zone in which the first radiation intensities are distributed and a zone in which the second radiation intensities are distributed.

In at least one embodiment of the present disclosure, each of the patch antenna units includes two patch antennas, where an electric field direction of each of the patch antenna units is parallel to a central connecting line between the patch antennas. Phases of the feeding electromagnetic wave to the patch antennas are substantially identical. When an AC (alternating current) voltage is applied to one or other of the patch antennas, each of the patch antenna units generates the first radiation intensity or the second radiation intensity. When the patch antennas and the ground plane are substantially equipotential, each of the patch antenna units generates the third radiation intensity.

In at least one embodiment of the present disclosure, the electromagnetic beams have a wavelength apiece. A unit center spacing is present between centers of adjacent two of the patch antenna units. The unit center spacing is 0.2-1 time the wavelength.

At least one embodiment of the present disclosure provides a method of multi-beamforming, in which electromagnetic beams formed can achieve rapid scanning in space.

The method of multi-beamforming provided in at least one embodiment of the present disclosure includes: providing a liquid crystal modulation structure, where the liquid crystal modulation structure includes a ground plane, patch antenna units and a liquid crystal layer, where the ground plane is spaced apart from the patch antenna units, and the liquid crystal layer is disposed between the ground plane and the patch antenna units; utilizing a feeding structure to receive a feeding signal and to generate substantially an equiphase feeding electromagnetic wave to the patch antenna units of the liquid crystal modulation structure; generating, by the patch antenna units, first radiation intensities and second radiation intensities respectively when the patch antenna units are utilized to receive AC voltages respectively, so that the liquid crystal modulation structure forms an amplitude interference pattern, where the liquid crystal modulation structure has a phase difference of 135-225 degrees between an electric field radiation in each of the first radiation intensities and an electric field radiation in each of the second radiation intensities; and utilizing interference of the feeding electromagnetic wave and the amplitude interference pattern to form electromagnetic beams, where an angle difference between two azimuth angles of two of the electromagnetic beams is 135-225 degrees, and arrangement positions of the first radiation intensities and the second radiation intensities corresponding to the amplitude interference pattern change the azimuth angle and a tilt angle of each of the electromagnetic beams.

Based on the above, the multi-beam liquid crystal antenna disclosed in the above embodiments can radiate electromagnetic beams to shorten the scanning time, thus achieving an effect of real-time monitoring of human physiological information.

BRIEF DESCRIPTION OF THE DRAWINGS

For a more complete understanding of embodiments and their advantages, the description below is made with reference to the drawings.

DETAILED DESCRIPTION

Figure 1A:
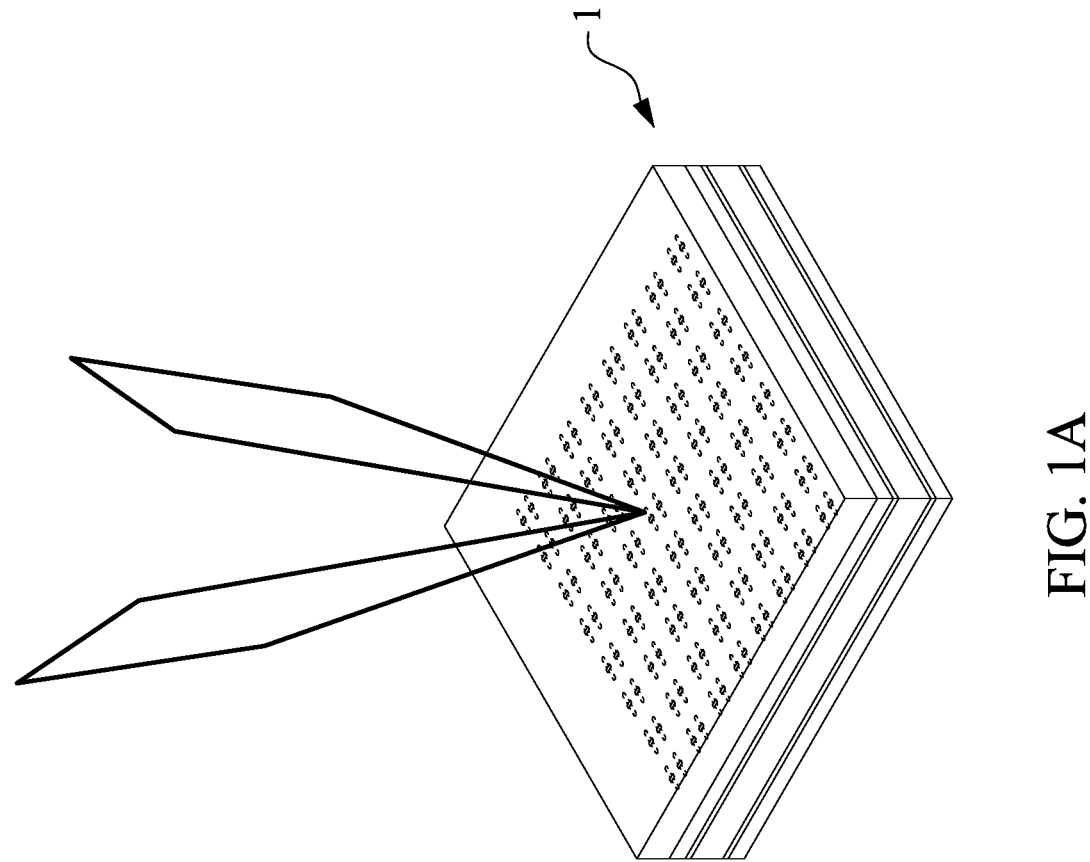
FIG. 1A is a schematic diagram of a multi-beam liquid crystal antenna radiating electromagnetic beams according to at least one embodiment of the present disclosure.

For clearly introducing the technical features of the present application below, the dimensions (such as length, width, thickness, and depth) of components (such as layers, membranes, substrates, and areas) in the figures will be scaled up disproportionately, and the number of some components will be reduced. Accordingly, the description and interpretation of the embodiments below shall not be limited to the number of components and the dimensions and shapes of the components shown in the figures, but shall encompass dimensions, shapes and deviations therebetween as a result of actual manufacturing processes and/or tolerances. For example, a flat surface shown in a figure may have a feature of roughness and/or nonlinearity, while an acute angle shown in a figure may be circular. Therefore, the components shown in the present application are mainly used for schematic purposes, and are not intended to accurately depict the actual shapes of the components, nor are they used to limit the claims of the patent application.

Secondly, the words "about", "approximately" or "substantially" appearing herein encompass not only clearly recorded values and ranges of values, but also allowable deviation ranges understood by persons of ordinary skill in the art, in which the deviation ranges may be determined by errors resulting from measurements, and the errors are due, for example, to limitations of both a measuring system and process conditions. For example, two objects (such as a plane or a trace of a substrate) are "substantially parallel" or "substantially vertical", where "substantially parallel" and "substantially vertical" respectively represent that the parallelism and perpendicularity between the two objects may contain non-parallelism and non-perpendicularity caused by the allowable deviation ranges.

In addition, the word "about" can mean within one or more standard deviations of the above values, such as ±30%, ±20%, ±10% or ±5%. The terms "about", "approximately" or "substantially" and the like used in the present application may be used to select acceptable deviation ranges or standard deviations based on optical, etchable, mechanical or other properties, rather than a single standard deviation to apply all of the above optical, etchable, mechanical or other properties.

Spatially relative terms used in the present disclosure, such as "under", "below", "above", "over", are used to facilitate the description of a relative relationship between one component or feature and another component or feature, as shown in the figures. The real meaning of the spatially relative terms involves other orientations. For example, when turning upside down and downside up at 180 degrees, the relationship between one component and another may change from "under" and "below" to "above" and "over". In addition, spatially relative statements used in the present disclosure shall be similarly interpreted.

In addition, the present disclosure may be implemented or applied by means of other different specific embodiments, the details of the present disclosure may be based on different viewpoints and applications, and various embodiments can be combined, modified and changed without deviating from the idea of the present disclosure.

Figure 1B:
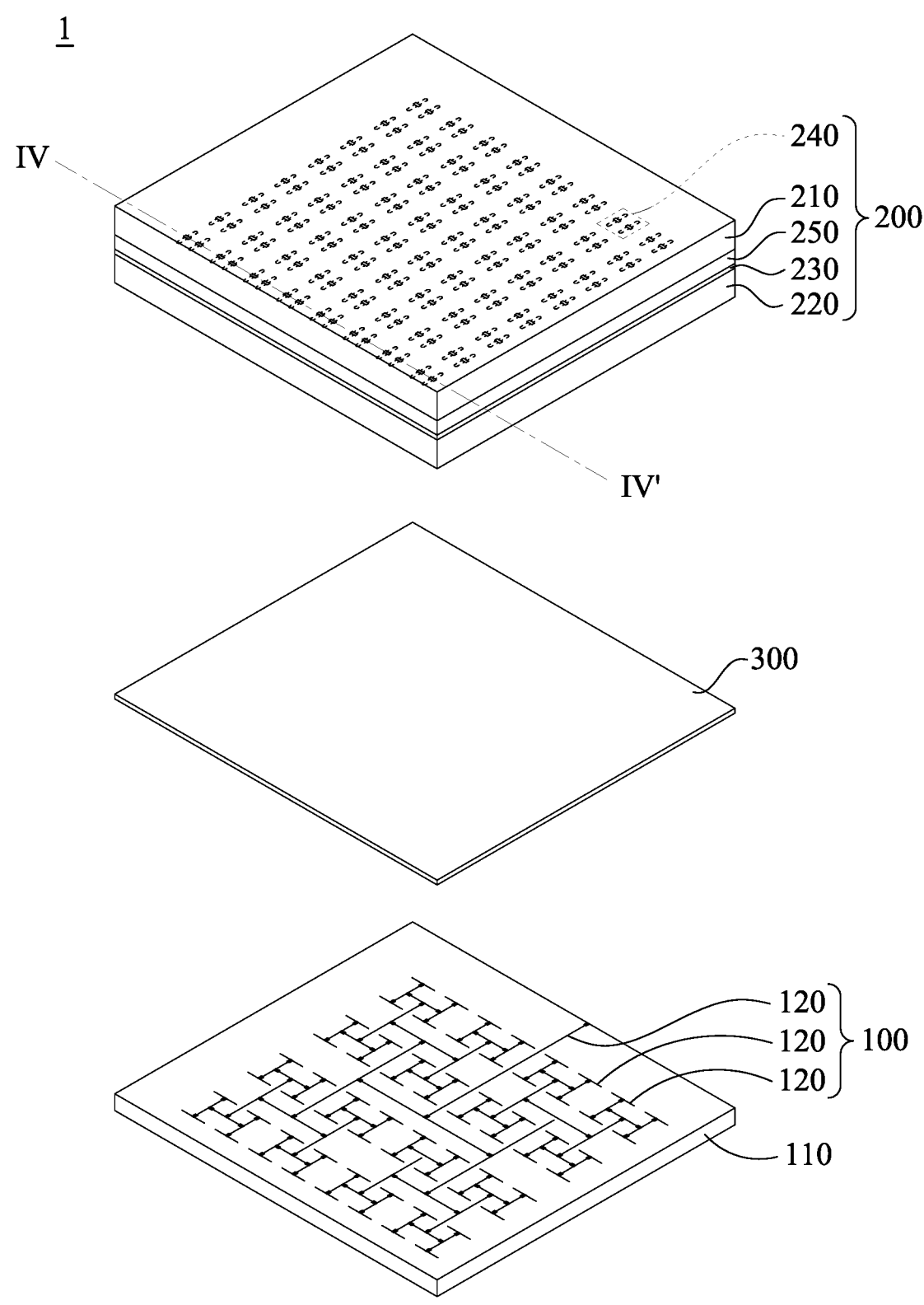
FIG. 1B is a stereoscopic exploded view of the multi-beam liquid crystal antenna in FIG. 1A.

FIG. 1A is a schematic diagram of a multi-beam liquid crystal antenna 1 radiating electromagnetic beams according to at least one embodiment of the present disclosure, and FIG. 1B is a stereoscopic exploded view of the multi-beam liquid crystal antenna 1 in FIG. 1A. Referring to FIG. 1A and FIG. 1B, the multi-beam liquid crystal antenna 1 includes a feeding structure 100, a liquid crystal modulation structure 200 and an adhesion layer 300. The feeding structure 100 forms a feeding electromagnetic wave when receiving a feeding signal, and the energy of the feeding signal is coupled to the liquid crystal modulation structure 200 so that the multi-beam liquid crystal antenna 1 radiates electromagnetic beams, where an angle difference between two azimuth angles of two electromagnetic beams is 135-225 degrees. In this embodiment, the multi-beam liquid crystal antenna 1 radiates two electromagnetic beams, and an angle difference between azimuth angles of the electromagnetic beams is 180 degrees. The electromagnetic beams radiated by the multi-beam liquid crystal antenna 1 can achieve scanning quickly in space.

In this embodiment, the feeding structure 100 is a microstrip feeding circuit board, but is not limited to this. The feeding structure 100 may also be a horn antenna, a waveguide, a stripline feeding circuit board or the like. The feeding structure 100 includes a dielectric layer 110 and traces 120, where the traces 120 are disposed on the dielectric layer 110. The liquid crystal modulation structure 200 includes two substrates 210 and 220 disposed opposite to each other, a ground plane 230, patch antenna units 240 and a liquid crystal layer 250. The ground plane 230 is disposed on the substrate 220, and the patch antenna units 240 are disposed on the other substrate 210. Each of the patch antenna units 240 includes two patch antennas 241, where the patch antennas 241 are spaced apart. The liquid crystal layer 250 is disposed between the ground plane 230 and the patch antenna units 240.

The adhesion layer 300 is disposed between the dielectric layer 110 of the feeding structure 100 and the substrate 220 of the liquid crystal modulation structure 200, and configured to adhere the feeding structure 100 to the liquid crystal modulation structure 200. It should be noted that the traces 120 can be disposed on the side, that the adhesion layer 300 is disposed, of the dielectric layer 110 or on the side opposite to the adhesion layer 300. In this embodiment, the traces 120 are disposed on the side of the dielectric layer 110 opposite to the adhesion layer 300, that is, the traces 120 are disposed on the bottom surface of the dielectric layer 110 in FIG. 1B, and the patch antenna units 240 are disposed on the side of the substrate 210 adjacent to the liquid crystal layer 250. So, in practice, the traces 120 in FIG. 1B will be covered by the dielectric layer 110, and the patch antenna units 240 in FIG. 1B will be covered by the substrate 210. However, for clear display, the traces 120 and the patch antenna units 240 are shown in solid lines.

Figure 2:
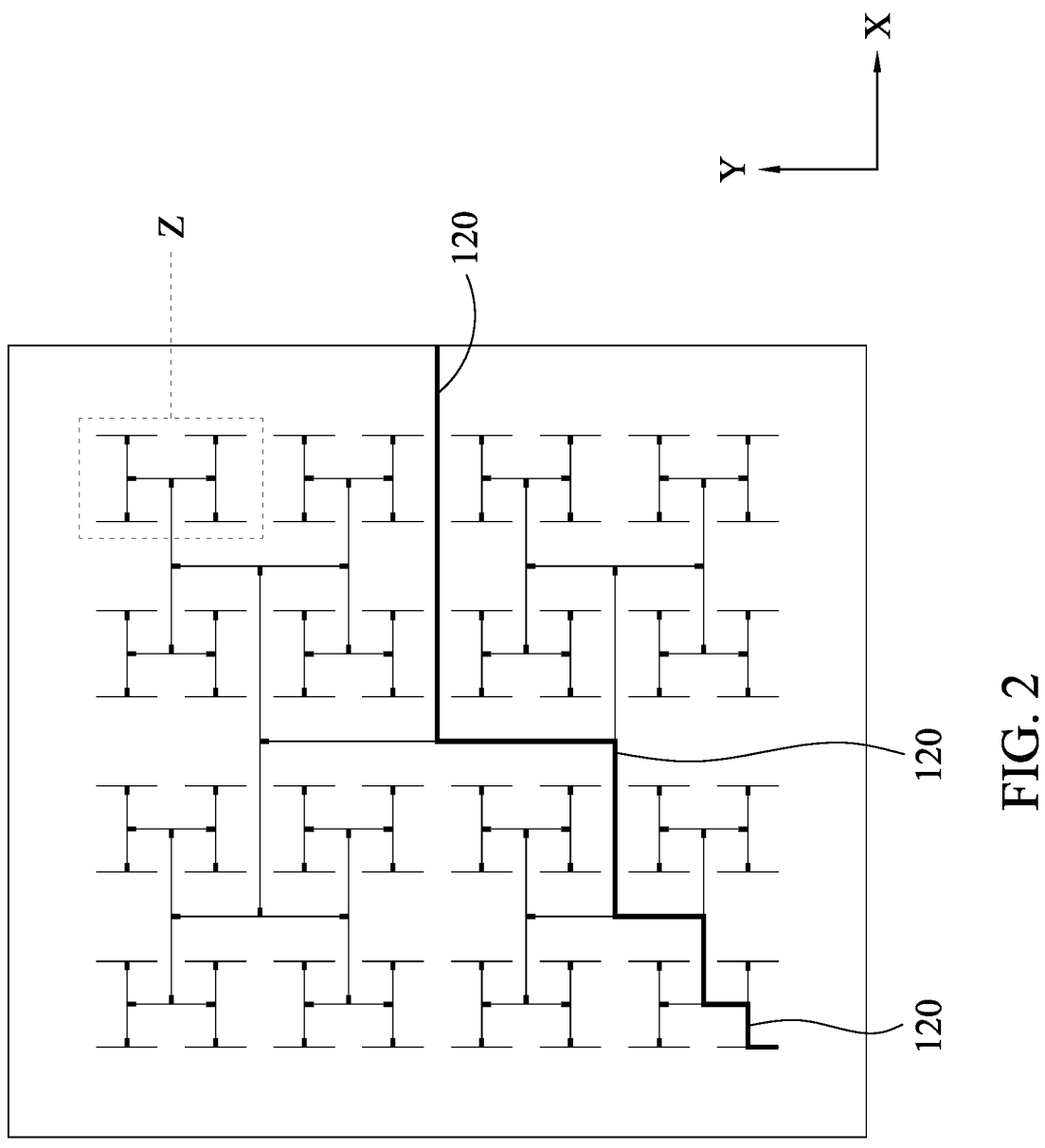
FIG. 2 is a schematic diagram of a feeding structure in which a feeding transmission path is bold in FIG. 1B.

FIG. 2 is a schematic diagram of the feeding structure 100 in which a feeding transmission path is bold in FIG. 1B. Referring to FIG. 1B and FIG. 2, the feeding structure 100 is configured to receive a feeding signal and to generate an equiphase feeding electromagnetic wave to the patch antennas 241 of the patch antenna units 240. The traces 120 of the feeding structure 100 form feeding transmission paths that are substantially identical in length. Each of the feeding transmission paths corresponds to one of the patch antennas 241 of one patch antenna unit 240. That is, the feeding signal is divided into branch signals via the feeding transmission paths. The branch signals form electromagnetic waves respectively, and the electromagnetic waves are substantially identical in amplitude and phase, that is, differences in amplitude and phase between the electromagnetic waves are less than 10%. That is also to say, the feeding electromagnetic wave is divided equally into electromagnetic waves which are then coupled to the patch antennas 241 of the patch antenna units 240 respectively.

Figure 3:
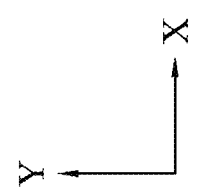
FIG. 3 is a top view of a liquid crystal modulation structure in FIG. 1B.
Figure 4:
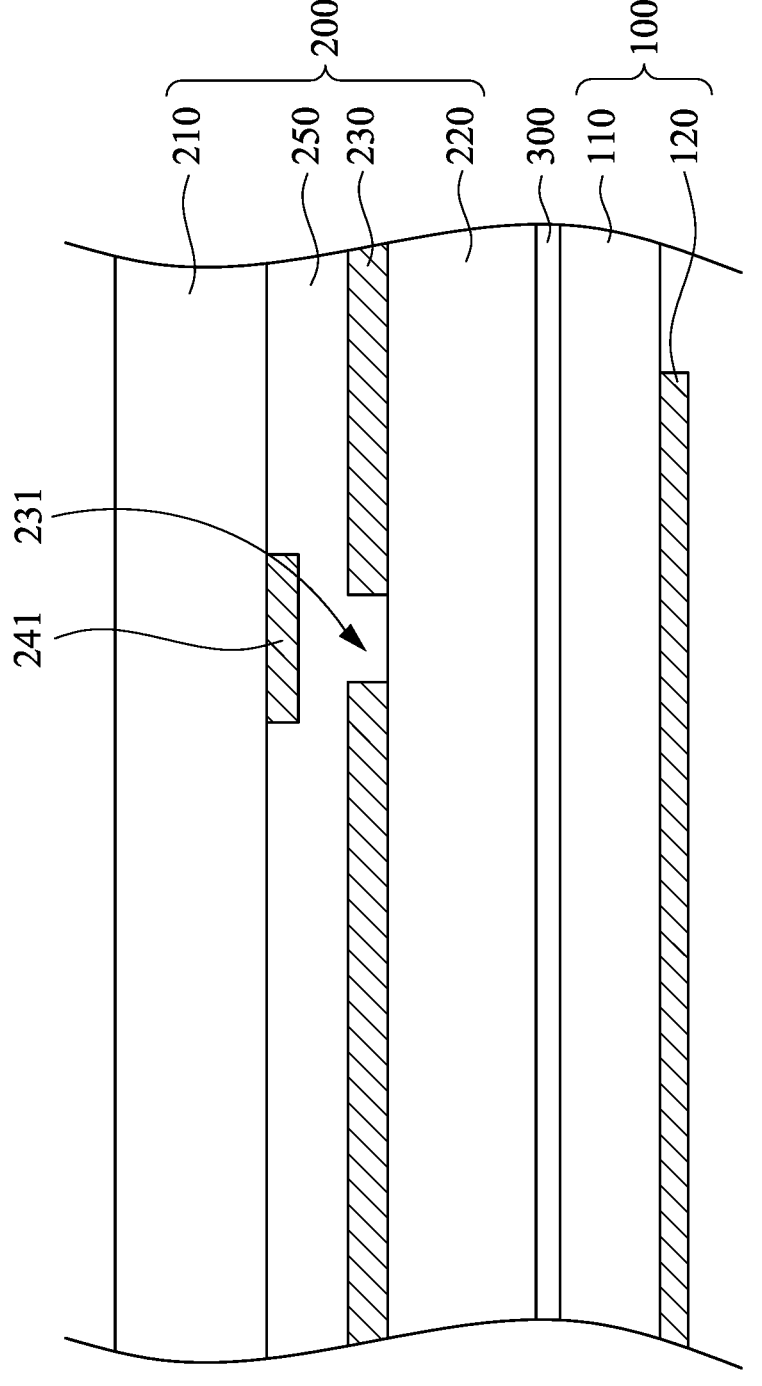
FIG. 4 is a section view of the multi-beam liquid crystal antenna along an IV-IV' line in FIG. 1B according to at least one embodiment of the present disclosure.

FIG. 3 is a top view of the liquid crystal modulation structure 200 in FIG. 1B, where the patch antenna units 240 are shown in solid lines for clear display. FIG. 4 is a section view of the multi-beam liquid crystal antenna 1 along an IV-IV' line in FIG. 1B according to at least one embodiment of the present disclosure, where FIG. 4 only corresponds to a patch antenna 241. Referring to FIGS. 1B, 3 and 4, the ground plane 230 in the liquid crystal modulation structure 200 is adjacent to the feeding structure 100. The ground plane 230 includes slotted holes 231. The slotted holes 231 are arranged in a direction X and a direction Y. Each of the slotted holes 231 is rectangular. In this example, each of the slotted holes 231 is in a shape of a rounded rectangle.

The patch antenna units 240 are also disposed on the ground plane 230 in the direction X and the direction Y. In this embodiment, the liquid crystal modulation structure 200 is illustrated by, but not limited to, the patch antenna units 240 arranged in an 8×8-matrix form. It should be noted that the number of the patch antenna units 240 of the liquid crystal modulation structure 200 can affect accuracies of the modulations of azimuth angles and tilt angles, as angles of spherical coordinates, of the electromagnetic beams, as well as the beamwidths of the electromagnetic beams. The more the number of the patch antenna units 240 is, the higher the accuracies of the azimuth angles and the tilt angles modulated are, and the narrower (more concentrated) the beamwidths of the electromagnetic beams are. In addition, the more the number of patch antenna units 240 is, the more the liquid crystal modulation structure 200 can display the complete amplitude interference pattern 400 (FIG. 6A).

A unit center spacing L is present between the centers of adjacent two of the patch antenna units 240 in the liquid crystal modulation structure 200. The dimension of the unit center spacing L is related to the wavelength of the electromagnetic beams. Further, the unit center spacing L is 0.2-1 times the wavelength. Each of the patch antenna units 240 is approximately square and has a side length of also 0.2-1 times the wavelength. In this embodiment, the unit center spacing L is 0.5 times the wavelength, and the side length of each of the patch antenna units 240 is also 0.5 times the wavelength. It should also be noted that the unit center spacing L can affect resolutions of the modulations of the azimuth angles and the tilt angles of the electromagnetic beams, that is, affect the modulatable ranges of the azimuth angles and the tilt angles. The smaller the unit center spacing L is, the higher the resolution of the modulated azimuth angles and tilt angles is (the wider the modulatable range is).

Figure 5:
FIG. 5 is a schematic diagram of an overlap between an area Z of the feeding structure in FIG. 2 and the area Z' of the liquid crystal modulation structure in FIG. 3.
Figure 5:
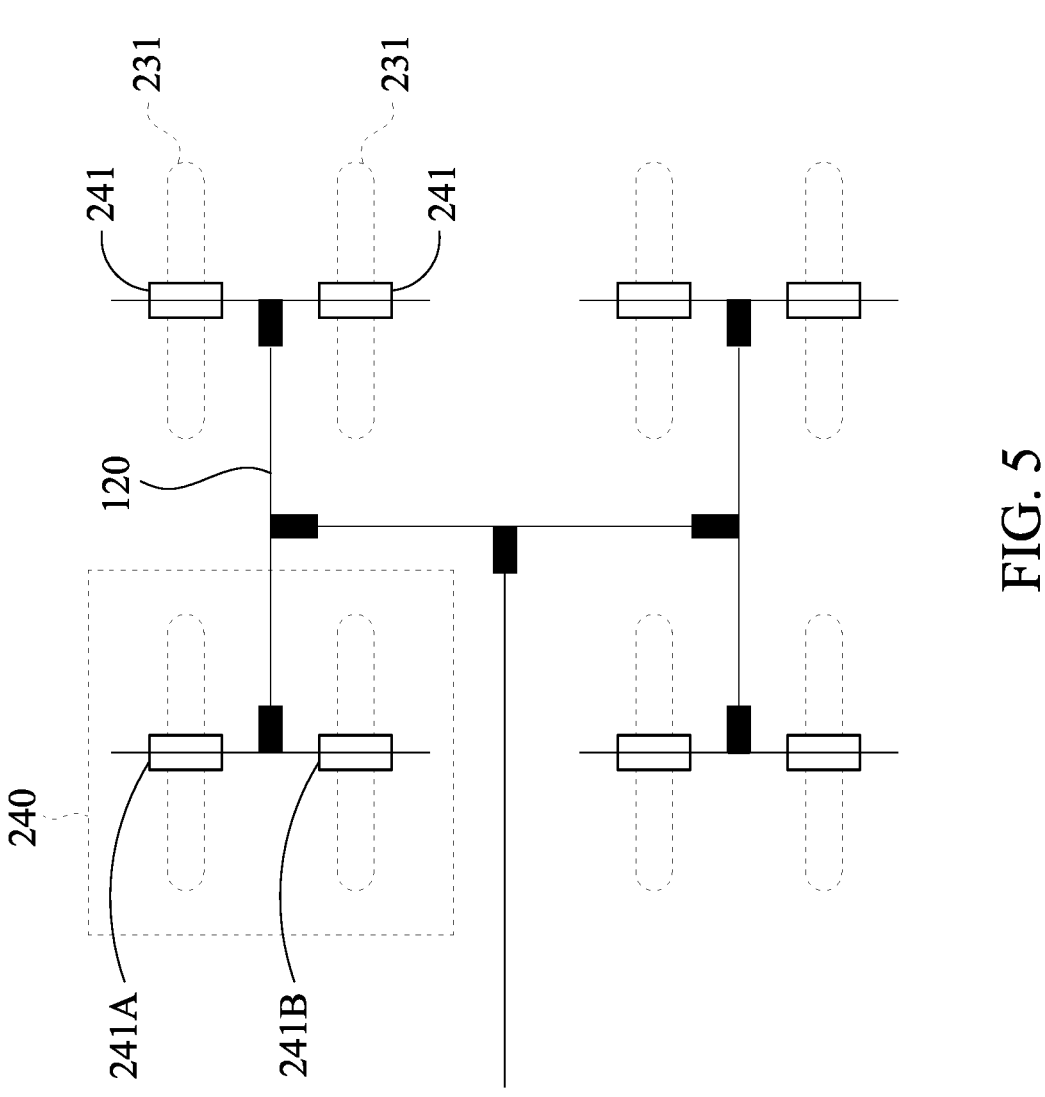

FIG. 5 is a schematic diagram of an overlap between an area Z of the feeding structure 100 in FIG. 2 and the area Z' of the liquid crystal modulation structure 200 in FIG. 3. Referring to FIGS. 2, 3 and 5, in the liquid crystal modulation structure 200, an electric field direction of each of the patch antenna units 240 is parallel to a central connecting line CL between the patch antennas 241 and parallel to the direction of the corresponding feeding transmission path (i.e., the direction Y). The patch antennas 241 overlap the slotted holes 231 respectively in a vertical projection direction of the ground plane 230, and correspond to the feeding transmission paths respectively. Each of the patch antennas 241 is rectangular and overlaps the center of the corresponding slotted hole 231. In each of the patch antenna units 240, two feeding transmission paths corresponding to two patch antennas 241 extend in opposite directions to their respective ends, and the two feeding transmission paths are substantially identical in length.

Referring to FIGS. 1B, 4, and 5, the liquid crystal layer 250 is disposed between the ground plane 230 and the patch antenna units 240 and disposed in the slotted holes 231. The liquid crystal layer 250 has a liquid crystal dielectric value. The liquid crystal dielectric value of the liquid crystal layer 250 disposed between each of the patch antenna units 240 and the ground plane 230 varies with a voltage difference between each of the patch antenna units 240 and the ground plane 230. The variation of the liquid crystal dielectric value of the liquid crystal layer 250 then affects the resonant frequency of radiation and the radiation power of the patch antenna unit 240.

Each of the patch antenna units 240 can generate a first radiation intensity or a second radiation intensity. The liquid crystal modulation structure 200 has a phase difference of 135-225 degrees, for example, 180 degrees, between an electric field radiation generated in the first radiation intensity and an electric field radiation generated in the second radiation intensity. When the phase difference is 180 degrees, the electric field radiations in the first radiation intensity and the second radiation intensity are opposite in polarity and substantially identical in amplitude. It should be noted that the first radiation intensity and the second radiation intensity are not limited to positive polarities of radiation intensities or negative polarities of radiation intensities. However, in this embodiment, the first radiation intensity and the second radiation intensity are respectively positive polarities and negative polarities of radiation intensities for illustration.

In each of the patch antenna units 240, an amplitude with a positive or negative polarity of the electric field radiation can be regulated by applying an AC voltage to one of the patch antennas 241, and an amplitude with a polarity opposite to that of the electric field radiation in the one of the patch antennas 241 can be regulated by applying an AC voltage to another patch antenna 241.

For example, when an AC voltage is applied to the patch antenna 241A, an amplitude with a positive polarity can be regulated, for example, the patch antenna unit 240 generates the first radiation intensity; and when an AC voltage is applied to the patch antenna 241B, an amplitude with a negative polarity can be regulated, for example, the patch antenna unit 240 generates the second radiation intensity. When an AC voltage is applied to the patch antenna 241B, an amplitude with a positive polarity can be regulated, for example, the patch antenna unit 240 generates the first radiation intensity; and when an AC voltage is applied to the patch antenna 241A, an amplitude with a negative polarity can be regulated, for example, the patch antenna unit 240 generates the second radiation intensity. In this example, the patch antenna 241A disposed at the top are set to regulate the amplitude with the positive polarity (i.e., the first radiation intensity) of the electric field radiation, and the patch antenna 241B disposed at the bottom are set to regulate the amplitude with the negative polarity (i.e., the second radiation intensity) of the electric field radiation.

In some embodiments, each of the patch antenna units 240 may generate the first radiation intensity, the second radiation intensity, or the zero-type third radiation intensity, where the amplitude of the electric field radiation in the zero-type third radiation intensity is substantially zero, that is, the amplitude of the electric field radiation in the zero-type third radiation intensity is less than 10% of the amplitude of the electric field radiation in the first radiation intensity or the second radiation intensity. The zero-type third radiation intensity generated by the patch antenna unit 240 is controlled in such a manner that no AC voltage is applied to two patch antennas 241 of the patch antenna unit 240 so that the patch antennas 241 and the ground plane 230 are substantially equipotential. In some other embodiments, when a voltage of 0 volts is applied to two patch antennas 241 of the patch antenna unit 240, the patch antenna unit 240 generates the zero-type third radiation intensity. In some other embodiments, when the voltage applied to the ground plane 230 is substantially identical to the voltage applied to the two patch antennas 241 of the patch antenna unit 240, the patch antenna unit 240 generates the zero-type third radiation intensity.

Figure 6B:
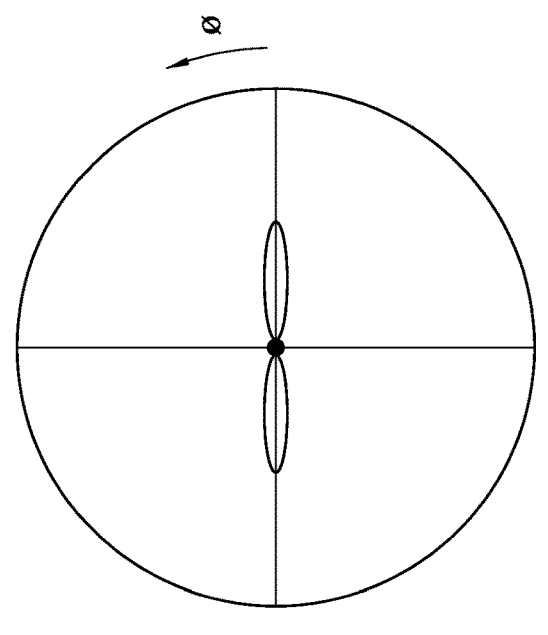
FIG. 6B is a schematic diagram of a horizontal projection of the electromagnetic beams radiated by the multi-beam liquid crystal antenna in FIG. 6A.
Figure 6A:
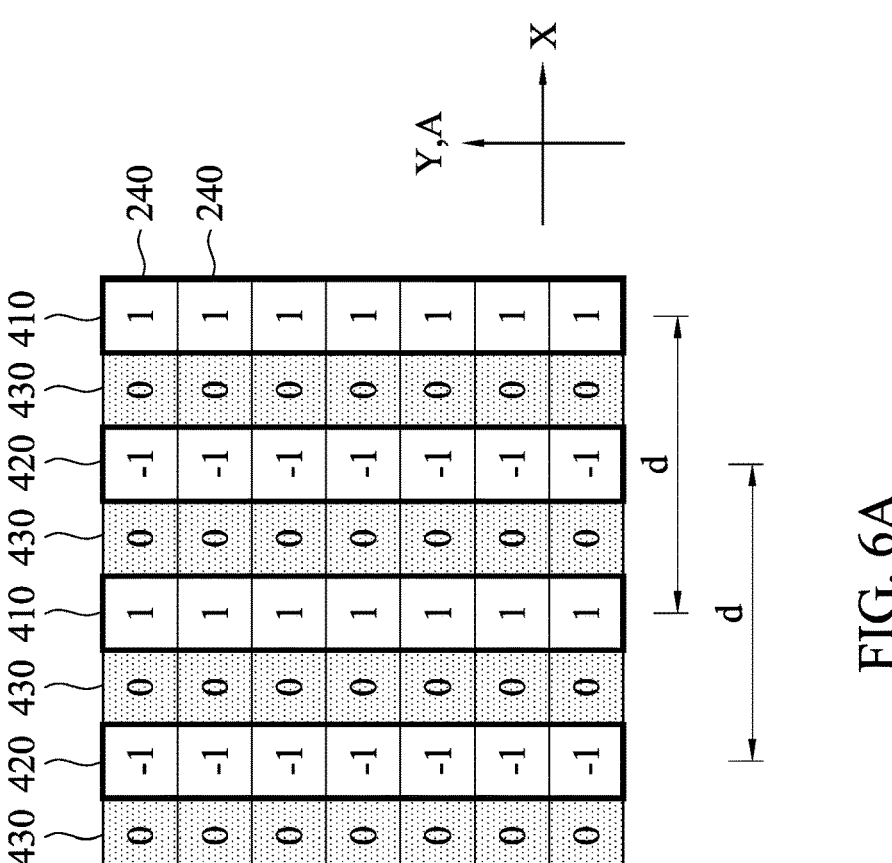
FIG. 6A is a schematic diagram of an amplitude interference pattern beams with an angle θ of 30 degrees and an angle φ of 0 degree and with the angle θ of 30 degrees and the angle φ of 180 degrees) of the multi-beam liquid crystal antenna according to at least one embodiment of the present disclosure.

FIG. 6A is a schematic diagram of an amplitude interference pattern 400 formed by the liquid crystal modulation structure 200 (modulating electromagnetic beams with an angle θ of 30 degrees and an angle φ of 0 degree and with the angle θ of 30 degrees and the angle φ of 180 degrees) of the multi-beam liquid crystal antenna according to at least one embodiment of the present disclosure, and FIG. 6B is a schematic diagram of a horizontal projection of the electromagnetic beams radiated by the multi-beam liquid crystal antenna in FIG. 6A. Referring to FIGS. 1B, 6A and 6B, the multi-beam liquid crystal antenna 1 can form electromagnetic beams by inputting a feeding signal and controlling the radiation intensity of each of the patch antenna units 240 in the liquid crystal modulation structure 200. In particular, the feeding structure 100 is utilized to receive a feeding signal and to generate an equiphase feeding electromagnetic wave to the patch antenna units 240 of the liquid crystal modulation structure 200. Then, an amplitude interference pattern 400 is formed when the patch antenna units 240 of the liquid crystal modulation structure 200 are utilized to respectively receive AC voltages.

Next, interference of the feeding electromagnetic wave and the amplitude interference pattern 400 is utilized to form the electromagnetic beams, where the electromagnetic beams are directed at specific angles respectively, the specific angles, for example, at a range of tilt angles θ (hereinafter referred to angles θ) of 0-90 degrees, and at a range of azimuth angles φ (hereinafter referred to angles φ) of 0-360 degrees. In this embodiment, one of the electromagnetic beams is directed at an angle θ of 30 degrees and an angle φ of 0 degree, and another electromagnetic beam is directed at an angle θ of 30 degrees and an angle φ of 180 degrees. An angle difference between the azimuth angles of the electromagnetic beams is 180 degrees.

In the amplitude interference pattern 400, at least two of the patch antenna units 240 generate first radiation intensities (blocks marked with 1 shown in FIG. 6A), and at least another two of the patch antenna units 240 generate second radiation intensities (blocks marked with −1 shown in FIG. 6A). In some embodiments, in addition to the first and second radiation intensities, at least one of the patch antenna units 240 generates at least one zero-type third radiation intensity (a block marked with 0 shown in FIG. 6A), and a zone in which the at least one zero-type third radiation intensity is distributed is adjacent to a zone in which the first radiation intensities are distributed and a zone in which the second radiation intensities are distributed.

Further, the amplitude interference pattern 400 shows at least one first zone 410 and at least one second zone 420, where the adjacent first radiation intensities are distributed in one of the at least one first zone 410 and the adjacent second radiation intensities are distributed in one of the at least one second zone 420. The at least one first zone 410 and the at least one second zone 420 of the amplitude interference pattern 400 are arranged in at least one arrangement direction A. Concretely speaking, the at least one first zone 410 and the at least one second zone 420 have a certain width apiece, so that a centerline of the at least one first zone 410 and a centerline of the at least one second zone 420 are arranged in the at least one arrangement direction A.

In some embodiments, in the amplitude interference pattern 400, the at least one third zone 430 in which the at least one zero-type third radiation intensity is distributed is adjacent to the at least one first zone 410. In some embodiments, the at least one third zone 430 is adjacent to the at least one second zone 420. In some embodiments, the at least one third zone 430 is adjacent to the at least one first zone 410 and the at least one second zone 420 and disposed between the at least one first zone 410 and the at least one second zone 420.

Further, each of the electromagnetic beams has a beam axis. The beam axes are perpendicular to the at least one arrangement direction A at the liquid crystal modulation structure 200. For example, when the at least one first zone 410 and the at least one second zone 420 are arranged in the arrangement direction A, the multi-beam liquid crystal antenna 1 generates two electromagnetic beams, and the beam axes of the electromagnetic beams are perpendicular to the arrangement direction A in the vertical projection direction of the liquid crystal modulation structure 200. When the at least one first zone 410 and the at least one second zone 420 are arranged in two arrangement directions A, the multi-beam liquid crystal antenna generates four electromagnetic beams. The beam axes of two of the electromagnetic beams are perpendicular to one of the arrangement directions A in the vertical projection direction of the liquid crystal modulation structure 200, and the beam axes of the other two of the electromagnetic beams are perpendicular to the other arrangement direction A in the vertical projection direction of the liquid crystal modulation structure 200.

It should be noted that the process of forming an electromagnetic beam by interference of the feeding electromagnetic wave and the amplitude interference pattern 400 can be analyzed theoretically by use of a transmission diffraction grating. For example, the feeding electromagnetic wave is taken as incident light and the amplitude interference pattern 400 is taken as a grating, so that an emitted electromagnetic beam is used as diffraction light, where the first zone 410 and the second zone 420 in the amplitude interference pattern 400 are used as slits in the grating. In addition, a function representing the amplitude interference pattern 400 is a cosine function. In the amplitude interference pattern 400, a period from the first zone 410 through the third zone 430, the second zone 420, and the third zone 430 back to the first zone 410 is a period of the cosine function.

When the amplitude interference pattern 400 shows first zones 410, a distance between adjacent two of the first zones 410 is a zone spacing d. When the amplitude interference pattern 400 shows second zones 420, a distance between adjacent two of the second zones 420 is also the zone spacing d. The zone spacing d can be used as a grating spacing between the two slits in the grating, and should meet a constructive interference condition:

$$d\sin\theta = n\lambda$$

where, d represents the zone spacing (grating spacing), θ represents an included angle between an emitted electromagnetic beam and a normal, that is, a tilt angle of the electromagnetic beam (an angle of the incident light deviating from a line of incidence), n represents a diffraction series, and λ represents a wavelength of the electromagnetic beam (wavelength of the incident light). In this embodiment, n is 1 (first-order series). Therefore, as can be seen from the constructive interference condition, the tilt angles θ of the electromagnetic beams are inversely proportional to the zone spacings d.

As shown in FIGS. 6A and 6B, in the amplitude interference pattern 400, the first zones 410 and the second zones 420 are stripe-shaped and arranged in an arrangement direction A perpendicular to a direction X, and horizontal projections of the beam axes of the electromagnetic beams are perpendicular to the arrangement direction A and parallel to the direction X so that the angles φ of the electromagnetic beams are approximately 0 degree and 180 degrees, respectively.

Figure 7B:
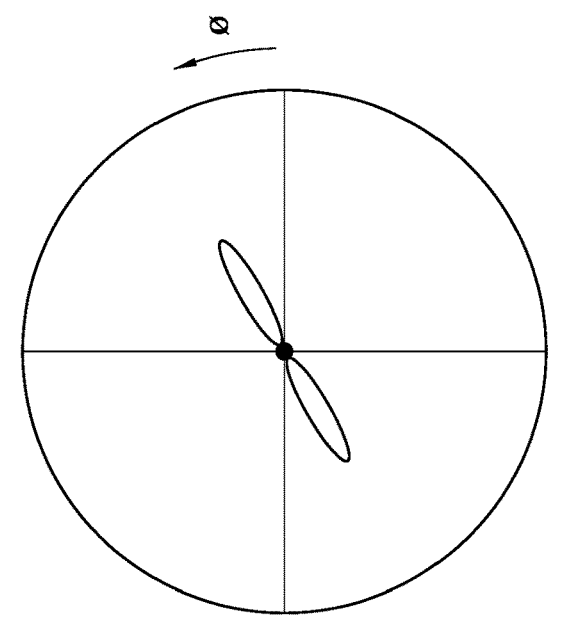
FIG. 7B is a schematic diagram of a horizontal projection of the electromagnetic beams radiated by the multi-beam liquid crystal antenna in FIG. 7A.
Figure 7A:
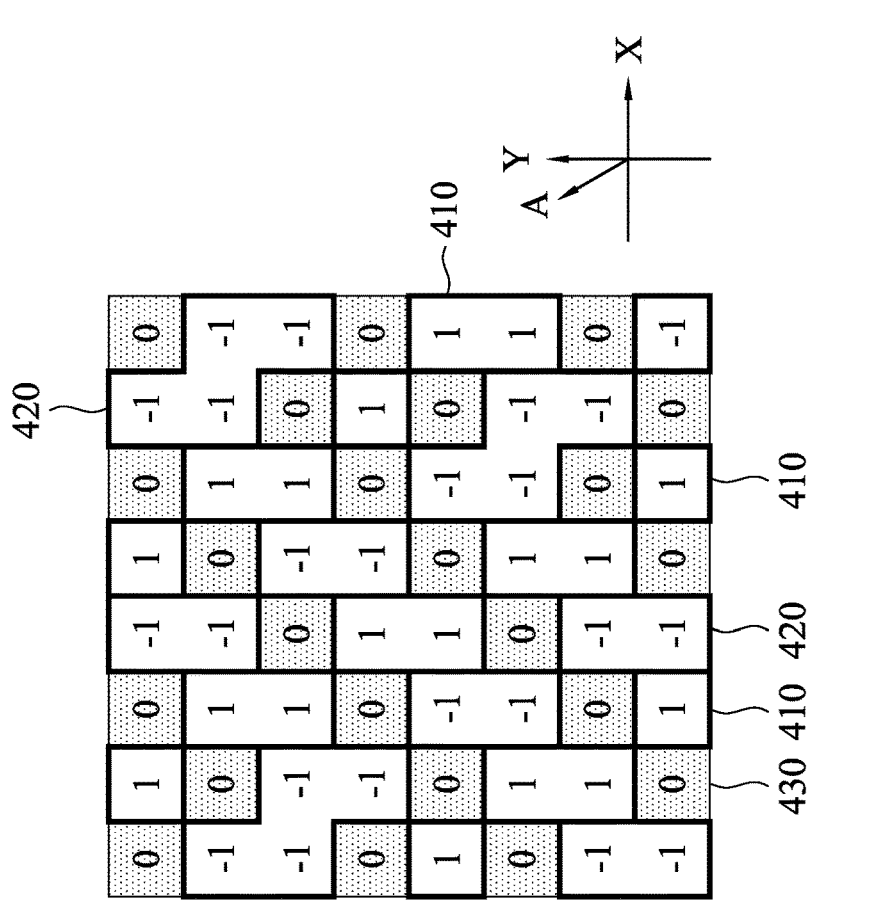
FIG. 7A is a schematic diagram of an amplitude interference pattern formed by the liquid crystal modulation structure (modulating electromagnetic beams with an angle θ of 30 degrees and an angle φ of 30 degrees and with the angle θ of 30 degrees and the angle φ of 210 degrees) of the multi-beam liquid crystal antenna according to at least one embodiment of the present disclosure.

FIG. 7A is a schematic diagram of an amplitude interference pattern 400 formed by the liquid crystal modulation structure 200 (modulating electromagnetic beams with an angle θ of 30 degrees and an angle φ of 30 degrees and with the angle θ of 30 degrees and the angle φ of 210 degrees) of the multi-beam liquid crystal antenna according to at least one embodiment of the present disclosure, and FIG. 7B is a schematic diagram of a horizontal projection of the electromagnetic beams radiated by the multi-beam liquid crystal antenna in FIG. 7A. Referring to FIGS. 7A and 7B, in the amplitude interference pattern 400, an included angle between the arrangement direction A of the first zones 410 and the second zones 420 and the direction X is approximately 120 degrees, and the horizontal projections of the beam axes of the electromagnetic beams are perpendicular to the arrangement direction A so that the angles φ of the electromagnetic beams are approximately 30 degree and 210 degrees, respectively.

Figure 8B:
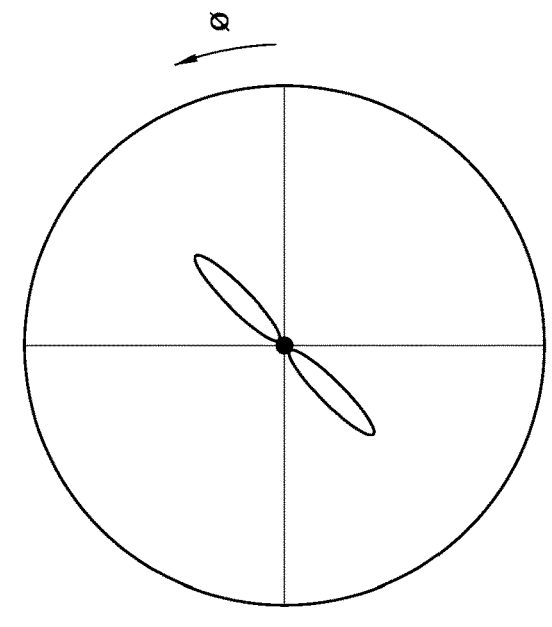
FIG. 8B is a schematic diagram of a horizontal projection of the electromagnetic beams radiated by the multi-beam liquid crystal antenna in FIG. 8A.
Figure 8A:
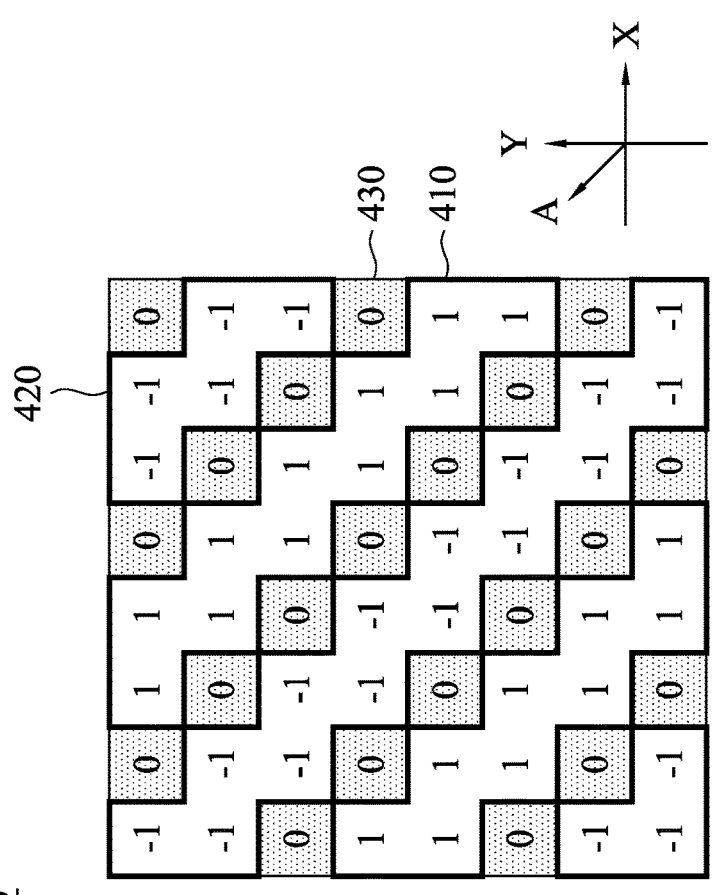
FIG. 8A is a schematic diagram of an amplitude interference pattern formed by the liquid crystal modulation structure (modulating electromagnetic beams with an angle θ of 30 degrees and an angle φ of 45 degrees and with the angle θ of 30 degrees and the angle φ of 225 degrees) of the multi-beam liquid crystal antenna according to at least one embodiment of the present disclosure.

FIG. 8A is a schematic diagram of an amplitude interference pattern 400 formed by the liquid crystal modulation structure 200 (modulating electromagnetic beams with an angle θ of 30 degrees and an angle φ of 45 degrees and with the angle θ of 30 degrees and the angle φ of 225 degrees) of the multi-beam liquid crystal antenna according to at least one embodiment of the present disclosure, and FIG. 8B is a schematic diagram of a horizontal projection of the electromagnetic beams radiated by the multi-beam liquid crystal antenna in FIG. 8A. Referring to FIGS. 8A and 8B, in the amplitude interference pattern 400, an included angle between the arrangement direction A of the first zones 410 and the second zones 420 and the direction X is approximately 135 degrees, and the horizontal projections of the beam axes of the electromagnetic beams are perpendicular to the arrangement direction A so that the angles φ of the electromagnetic beams are approximately 45 degree and 225 degrees, respectively.

Figure 9B:
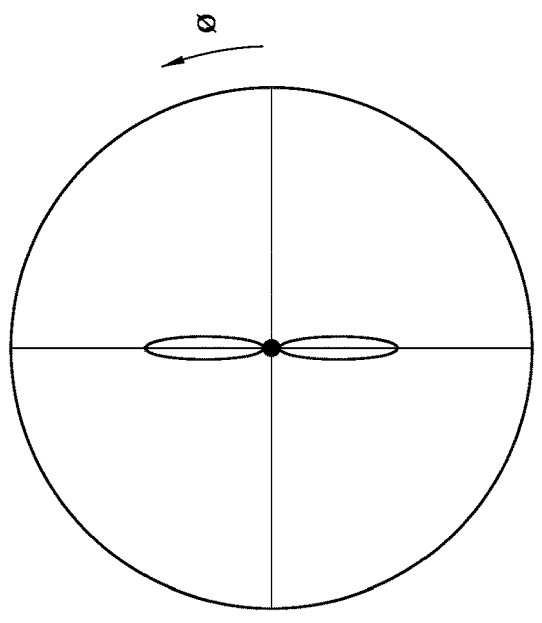
FIG. 9B is a schematic diagram of a horizontal projection of the electromagnetic beams radiated by the multi-beam liquid crystal antenna in FIG. 9A.
Figure 9A:
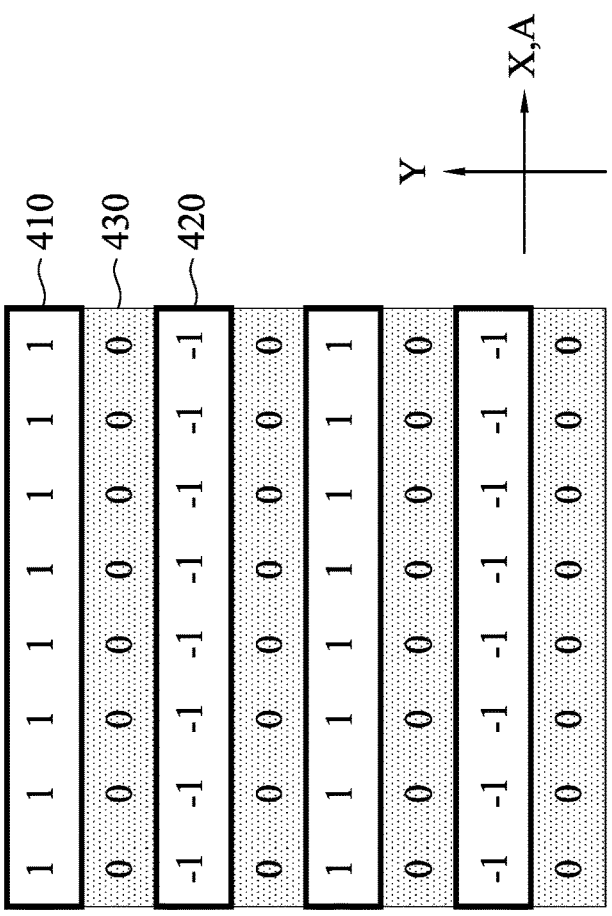
FIG. 9A is a schematic diagram of an amplitude interference pattern beams with an angle θ of 30 degrees and an angle φ of 90 degrees and with the angle θ of 30 degrees and the angle φ of 270 degrees) of the multi-beam liquid crystal antenna according to at least one embodiment of the present disclosure.

FIG. 9A is a schematic diagram of an amplitude interference pattern 400 formed by the liquid crystal modulation structure 200 (modulating electromagnetic beams with an angle θ of 30 degrees and an angle φ of 90 degrees and with the angle θ of 30 degrees and the angle φ of 270 degrees) of the multi-beam liquid crystal antenna according to at least one embodiment of the present disclosure, and FIG. 9B is a schematic diagram of a horizontal projection of the electromagnetic beams radiated by the multi-beam liquid crystal antenna in FIG. 9A. Referring to FIGS. 9A and 9B, in the amplitude interference pattern 400, the arrangement direction A of the first zones 410 and the second zones 420 is parallel to the direction X, and the horizontal projections of the beam axes of the electromagnetic beams are perpendicular to the arrangement direction A and perpendicular to the direction X so that the angles φ of the electromagnetic beams are approximately 90 degree and 270 degrees, respectively.

Figure 10B:
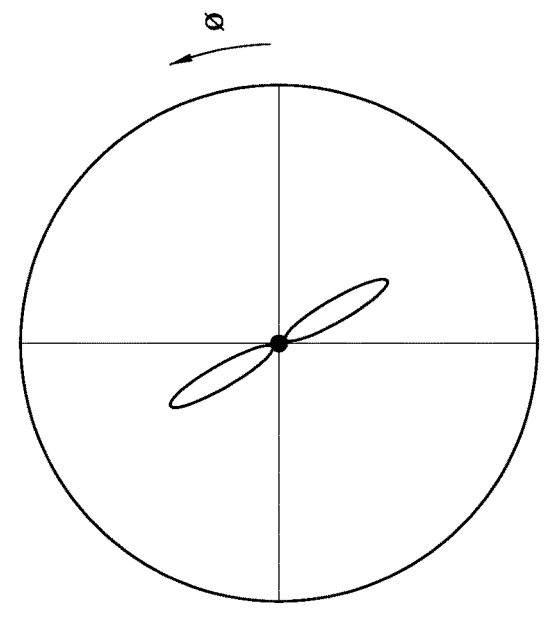
FIG. 10B is a schematic diagram of a horizontal projection of the electromagnetic beams radiated by the multi-beam liquid crystal antenna in FIG. 10A.
Figure 10A:
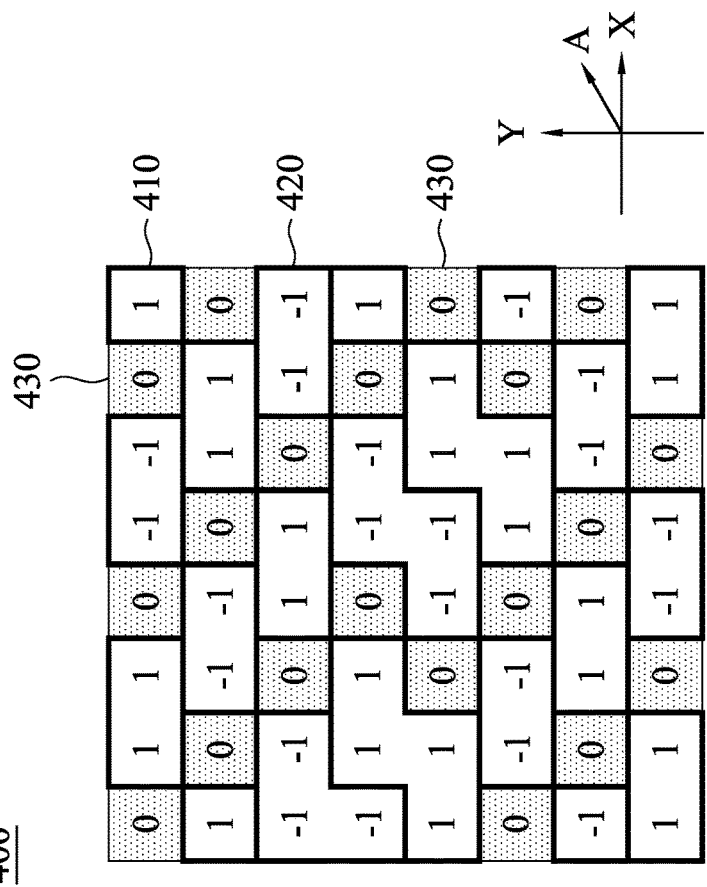
FIG. 10A is a schematic diagram of an amplitude interference pattern formed by the liquid crystal modulation structure (modulating electromagnetic beams with an angle θ of 30 degrees and an angle φ of 120 degrees and with the angle θ of 30 degrees and the angle φ of 300 degrees) of the multi-beam liquid crystal antenna according to at least one embodiment of the present disclosure.

FIG. 10A is a schematic diagram of an amplitude interference pattern 400 formed by the liquid crystal modulation structure 200 (modulating electromagnetic beams with an angle θ of 30 degrees and an angle φ of 120 degrees and with the angle θ of 30 degrees and the angle φ of 300 degrees) of the multi-beam liquid crystal antenna according to at least one embodiment of the present disclosure, and FIG. 10B is a schematic diagram of a horizontal projection of the electromagnetic beams radiated by the multi-beam liquid crystal antenna in FIG. 10A. Referring to FIGS. 10A and 10B, in the amplitude interference pattern 400, an included angle between the arrangement direction A of the first zones 410 and the second zones 420 and the direction X is approximately 30 degrees, and the horizontal projections of the beam axes of the electromagnetic beams are perpendicular to the arrangement direction A so that the angles φ of the electromagnetic beams are approximately 120 degree and 300 degrees, respectively.

As shown in FIGS. 6A-10B, a distance between the center (or centerline) of the first zone 410 and the center (or centerline) of the adjacent first zone 410 is approximately 4 times the unit center spacing L (zone spacing d), where the unit center spacing L is 0.5 times the wavelength; and a distance between the center (or centerline) of the second zone 420 and the center (or centerline) of the adjacent second zone 420 is also 4 times the unit center spacing L (zone spacing d). The angle θ computed by the constructive interference condition is 30 degrees, which accords with actual simulation results. The azimuth angles φ of the electromagnetic beams can be changed by varying the arrangement directions A of the first radiation intensities and the second radiation intensities at the same zone spacing d.

Figure 11B:
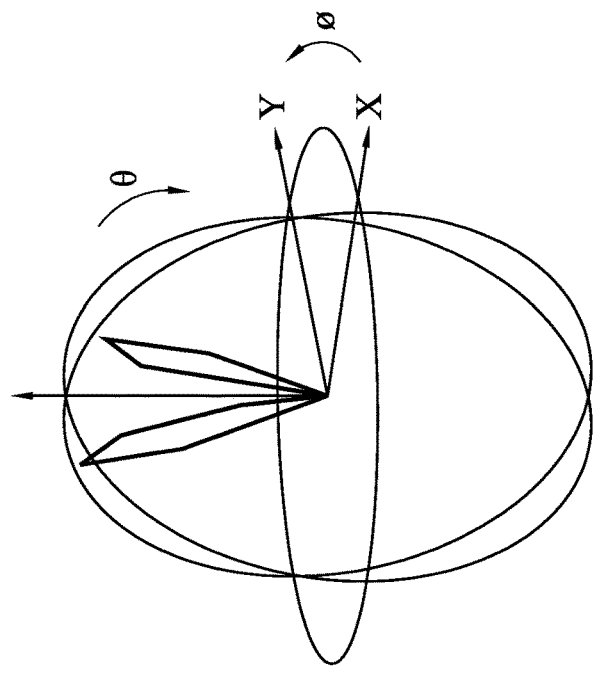
FIG. 11B is a three-dimensional schematic diagram of the electromagnetic beams radiated by the multi-beam liquid crystal antenna in FIG. 11A.
Figure 11A:
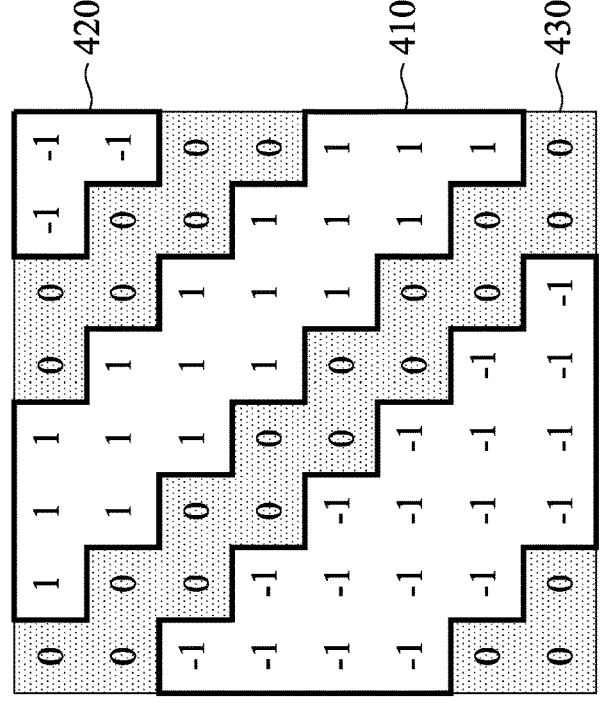
FIG. 11A is a schematic diagram of an amplitude interference pattern formed by the liquid crystal modulation structure (modulating electromagnetic beams with an angle θ of 15 degrees and an angle φ of 45 degrees and with the angle θ of 15 degrees and the angle φ of 225 degrees) of the multi-beam liquid crystal antenna according to at least one embodiment of the present disclosure.
Figure 12B:
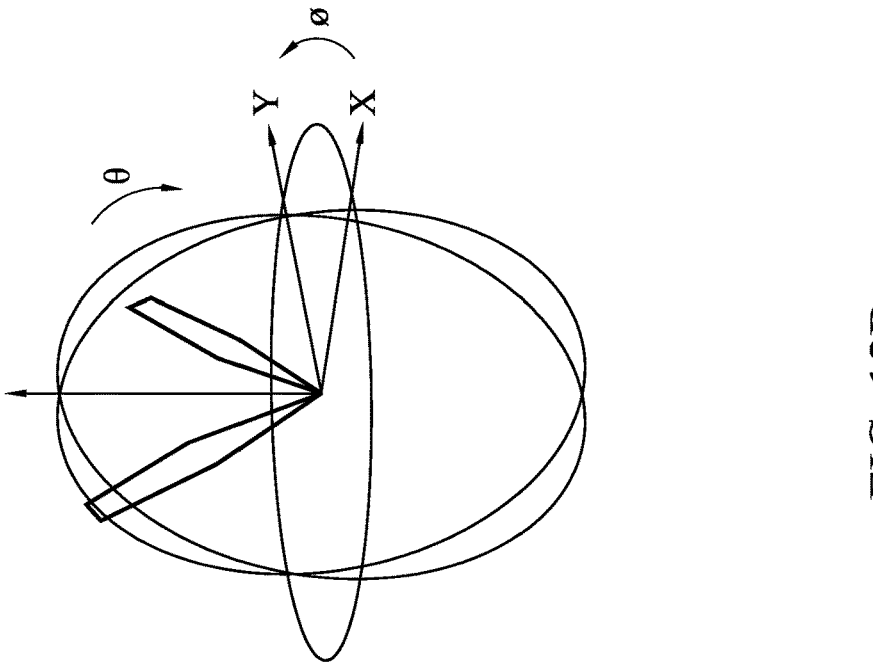
FIG. 12B is a three-dimensional schematic diagram of the electromagnetic beams radiated by the multi-beam liquid crystal antenna in FIG. 12A.
Figure 12A:
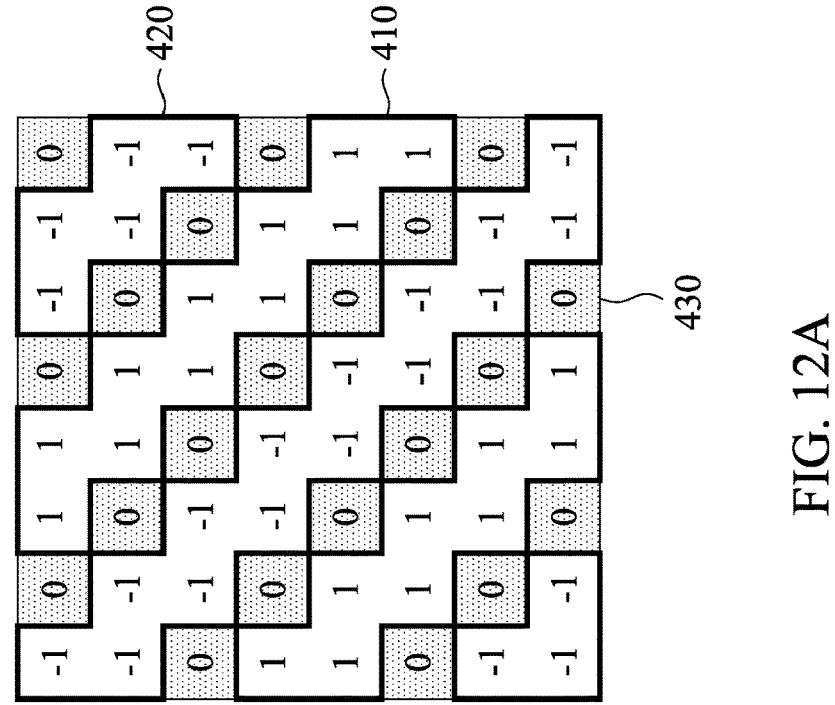
FIG. 12A is a schematic diagram of an amplitude interference pattern beams with an angle θ of 30 degrees and an angle φ of 45 degrees and with the angle θ of 30 degrees and the angle φ of 225 degrees) of the multi-beam liquid crystal antenna according to at least one embodiment of the present disclosure.
Figures 13A, 13B:
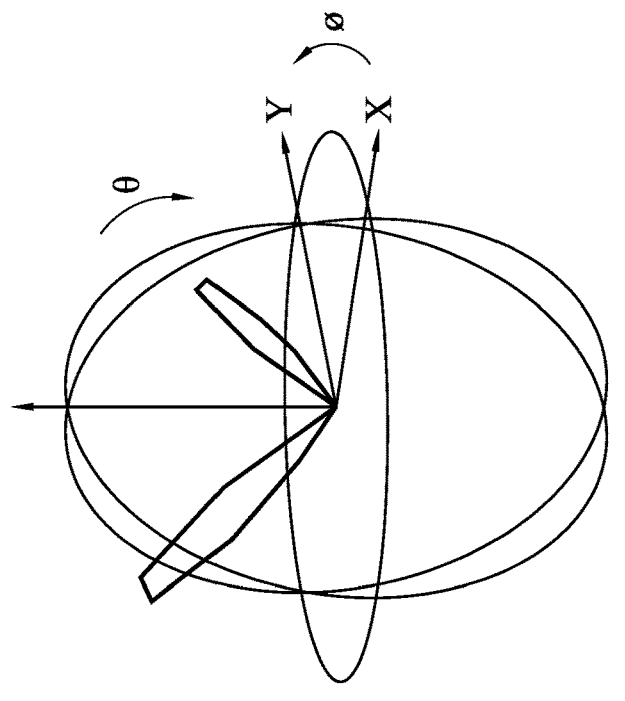
FIG. 13A is a schematic diagram of an amplitude interference pattern formed by the liquid crystal modulation structure (modulating electromagnetic beams with an angle ↓ of 45 degrees and an angle φ of 45 degrees and with the angle θ of 45 degrees and the angle φ of 225 degrees) of the multi-beam liquid crystal antenna according to at least one embodiment of the present disclosure.
FIG. 13B is a three-dimensional schematic diagram of the electromagnetic beams radiated by the multi-beam liquid crystal antenna in FIG. 13A.

FIGS. 11A, 12A and 13A are respectively schematic diagrams of amplitude interference patterns 400 formed by the liquid crystal modulation structure 200 (modulating electromagnetic beams with an angle θ of 15 degrees and an angle φ of 45 degrees and with the angle θ of 15 degrees and the angle φ of 225 degrees, with an angle θ of 30 degrees and an angle φ of 45 degrees and with the angle θ of 30 degrees and the angle φ of 225 degrees and with an angle θ of 45 degrees and an angle φ of 45 degrees and with the angle θ of 45 degrees and the angle φ of 225 degrees, respectively) of the multi-beam liquid crystal antenna according to at least one embodiment of the present disclosure, and FIGS. 11B, 12B and 13B are three-dimensional schematic diagrams of electromagnetic beams radiated by the multi-beam liquid crystal antenna in FIGS. 11A, 12A and 13A respectively. As shown in FIGS. 11A-13B, the arrangement directions A of the first zones 410 and the second zones 420 are identical, but as the zone spacings d between the centers of the first zones 410 and the centers of the adjacent first zones 410 gradually decrease, the angles θ of the electromagnetic beams gradually increase; and as the zone spacings d between the centers of the second zones 420 and the centers of the adjacent second zone 420 gradually decrease, the angles θ of the electromagnetic beams gradually increase. That is, the tilt angles θ of the electromagnetic beams are inversely proportional to the zone spacings d.

In addition, as shown in FIGS. 11A-13B, the first zones 410 and the second zones 420 are stripe-shaped, and the widths of the stripes gradually decrease as the zone spacings d decrease. It should be further noted that the amplitude interference pattern 400 shows at least two first zones 410 or at least two second zones 420 to obtain the zone spacing d, where the shown first zones 410 or second zones 420 are not limited to be complete zones. For example, as shown in FIG. 11A, the second zone 420 on the upper right does not show a full width, but the zone spacing d can still be obtained from the first zone 410 and the second zone 420 where the full width is shown.

Thus, according to the above embodiments, the azimuth angles φ and the tilt angles θ of the electromagnetic beams can be changed by varying the arrangement positions of the first radiation intensities and the second radiation intensities in the amplitude interference pattern 400.

Figure 14:
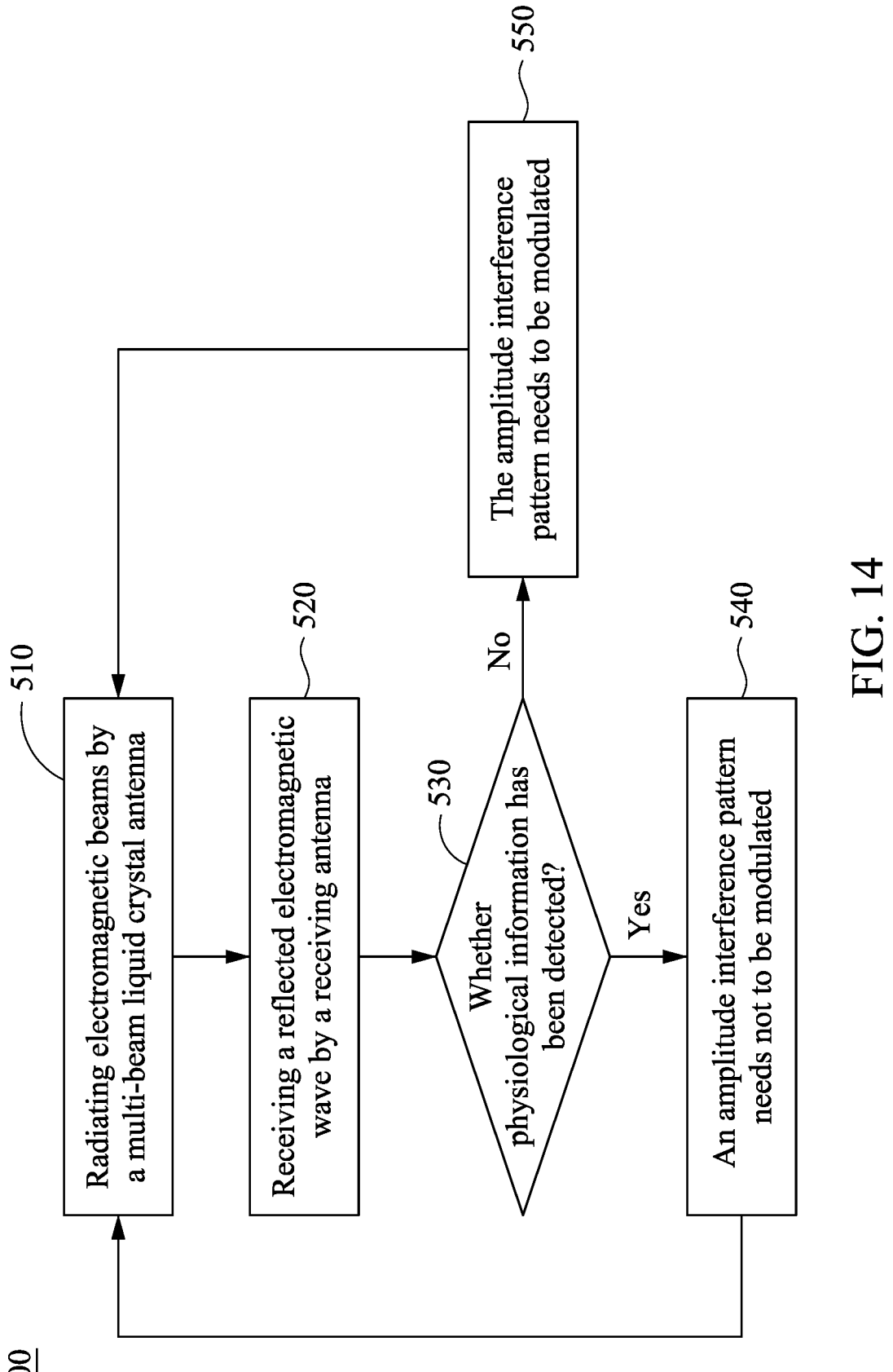
FIG. 14 is a flow diagram of a method of applying a multi-beam liquid crystal antenna to a radar device for scanning according to at least one embodiment of the present disclosure.

FIG. 14 is a flow diagram of a method 500 of applying a multi-beam liquid crystal antenna 1 to a radar device for scanning according to at least one embodiment of the present disclosure. Referring to FIG. 1B and FIG. 14, the multi-beam liquid crystal antenna 1 is set as a transmitting antenna of the radar device configured to detect human physiological information. In step 510, a multi-beam liquid crystal antenna 1 radiates electromagnetic beams. In step 520, a receiving antenna of the radar device receives a reflected electromagnetic wave. In step 530, a processor of the radar device can determine whether human physiological information is detected based on the reflected electromagnetic wave received by the receiving antenna, when any physiological information is detected, step 540 is performed, and when no physiological information is detected, step 550 is performed.

In step 540, the processor can compute the human physiological information without modulating an amplitude interference pattern 400 formed by a liquid crystal modulation structure 200 of the multi-beam liquid crystal antenna 1 (FIG. 6A). After step 540 is completed, an operation of returning to step 510 again is performed. In step 550, the processor controls AC voltages applied to patch antenna units 240 of the liquid crystal modulation structure 200 to modulate the amplitude interference pattern 400 formed by the liquid crystal modulation structure 200, thereby adjusting the radiation directions of electromagnetic beams (changing the azimuth angles φ and the tilt angles θ of the electromagnetic beams). After step 550 is completed, an operation of returning to step 510 again is performed. Thus, the radiation direction of the electromagnetic beams can be adjusted by controlling the radiation intensity of each of the patch antenna units 240. The multi-beam liquid crystal antenna 1 facilitates the use of the radar device to scan the electromagnetic beams by modulating the liquid crystal modulation structure 200.

In summary, the multi-beam liquid crystal antenna disclosed in the above embodiments can radiate electromagnetic beams which can not only scan quickly and shorten the time for detecting anomalies, but also radiate in a direction of a specific angle to increase the convenience of use. By the combination of the equiphase feeding electromagnetic wave and the amplitude interference pattern formed by the liquid crystal modulation structure, multi-beamforming will be achieved without the use of phase control elements, so the structure of the multi-beam liquid crystal antenna and the method of a multi-beamforming are simpler.

Although the present disclosure has been disclosed as above in embodiments, the embodiments are not intended to limit the present disclosure, and those of ordinary skill in the art may make some changes and embellishments within the spirit and scope of the present disclosure, therefore, the scope of protection of the present disclosure shall be defined in the attached claims.

What is claimed is:

1. A multi-beam liquid crystal antenna, comprising:
a liquid crystal modulation structure comprising a ground plane, a plurality of patch antenna units and a liquid crystal layer, wherein the ground plane is spaced apart from the patch antenna units, the liquid crystal layer is disposed between the ground plane and the patch antenna units, at least two of the patch antenna units each generate a first radiation intensity while at least another two of the patch antenna units each generate a second radiation intensity, and the liquid crystal modulation structure has a phase difference of 135-225 degrees between an electric field radiation in each of the first radiation intensities and an electric field radiation in each of the second radiation intensities; and
a feeding structure configured to receive a feeding signal and to generate substantially an equiphase feeding electromagnetic wave to the patch antenna units;
when the patch antenna units generate the first radiation intensities and the second radiation intensities respectively, the liquid crystal modulation structure forms an amplitude interference pattern, and the feeding electromagnetic wave interferes with the amplitude interference pattern to form a plurality of electromagnetic beams, where an angle difference between two azimuth angles of two of the electromagnetic beams is 135-225 degrees, and arrangement positions of the first radiation intensities and the second radiation intensities corresponding to the amplitude interference pattern change the azimuth angle and a tilt angle of each of the electromagnetic beams,
wherein each of the patch antenna units generates one of the first radiation intensity, the second radiation intensity and a zero-type third radiation intensity, an amplitude of an electric field radiation in the zero-type third radiation intensity is substantially zero, and the patch antenna units generate the first radiation intensities, the second radiation intensities and at least one zero-type third radiation intensity respectively,
wherein a third zone in which the at least one zero-type third radiation intensity is distributed is adjacent to at least one of a first zone in which the first radiation intensities are distributed and a second zone in which the second radiation intensities are distributed, and
wherein the at least one zero-type third radiation intensity is generated as at least one patch antenna unit of the patch antenna units in the third zone and the ground plane are substantially equipotential.

2. The multi-beam liquid crystal antenna according to claim 1, wherein the amplitude interference pattern shows at least one first zone and at least one second zone, where adjacent ones of the first radiation intensities are distributed in one of the at least one first zone, adjacent ones of the second radiation intensities are distributed in one of the at least one second zone, and the at least one first zone and the at least one second zone are arranged in at least one arrangement direction.

3. The multi-beam liquid crystal antenna according to claim 2, wherein each of the electromagnetic beams has a beam axis, and the beam axes are perpendicular to the at least one arrangement direction at the liquid crystal modulation structure.

4. The multi-beam liquid crystal antenna according to claim 2, wherein when the amplitude interference pattern shows a plurality of first zones, a distance between adjacent two of the first zones is a zone spacing, and the tilt angle of each of the electromagnetic beams is inversely proportional to the zone spacing.

5. The multi-beam liquid crystal antenna according to claim 4, wherein when the amplitude interference pattern shows a plurality of second zones, a distance between adjacent two of the second zones is the zone spacing.

6. The multi-beam liquid crystal antenna according to claim 1, wherein each of the patch antenna units comprises two patch antennas, where an electric field direction of each of the patch antenna units is parallel to a central connecting line between the patch antennas, and phases of the feeding electromagnetic wave to the patch antennas are substantially identical;

when an AC (alternating current) voltage is applied to one or other of the patch antennas, each of the patch antenna units generates the first radiation intensity or the second radiation intensity; and when the patch antennas and the ground plane are substantially equipotential, each of the patch antenna units generates the zero-type third radiation intensity.

7. The multi-beam liquid crystal antenna according to claim 1, wherein the electromagnetic beams have a wavelength apiece, a unit center spacing is present between centers of adjacent two of the patch antenna units, and the unit center spacing is 0.2-1 times the wavelength.

8. A method of multi-beamforming, comprising:

providing a liquid crystal modulation structure, wherein the liquid crystal modulation structure comprises a ground plane, a plurality of patch antenna units and a liquid crystal layer, where the ground plane is spaced apart from the patch antenna units, and the liquid crystal layer is disposed between the ground plane and the patch antenna units;

utilizing a feeding structure to receive a feeding signal and to generate substantially an equiphase feeding electromagnetic wave to the patch antenna units of the liquid crystal modulation structure;

generating, by the patch antenna units, a plurality of first radiation intensities and a plurality of second radiation intensities respectively when the patch antenna units are utilized to receive a plurality of AC voltages respectively, so that the liquid crystal modulation structure forms an amplitude interference pattern, where the liquid crystal modulation structure has a phase difference of 135-225 degrees between an electric field radiation in each of the first radiation intensities and an electric field radiation in each of the second radiation intensities; and utilizing interference of the feeding electromagnetic wave and the amplitude interference pattern to form a plurality of electromagnetic beams, where an angle difference between two azimuth angles of two of the electromagnetic beams is 135-225 degrees, and arrangement positions of the first radiation intensities and the second radiation intensities corresponding to the amplitude interference pattern change the azimuth angle and a tilt angle of each of the electromagnetic beams, wherein each of the patch antenna units generates one of the first radiation intensity, the second radiation intensity and a zero-type third radiation intensity, an amplitude of an electric field radiation in the zero-type third radiation intensity is substantially zero, and the patch antenna units generate the first radiation intensities, the second radiation intensities and at least one zero-type third radiation intensity respectively, wherein a third zone in which the at least one zero-type third radiation intensity is distributed is adjacent to at least one of a first zone in which the first radiation intensities are distributed and a second zone in which the second radiation intensities are distributed, and wherein the at least one zero-type third radiation intensity is generated as at least one patch antenna unit of the patch antenna units in the third zone and the ground plane are substantially equipotential.

9. The method of multi-beamforming according to claim 8, wherein the amplitude interference pattern shows at least one first zone and at least one second zone, where adjacent ones of the first radiation intensities are distributed in one of the at least one first zone, adjacent ones of the second radiation intensities are distributed in one of the at least one second zone, and the at least one first zone and the at least one second zone are arranged in at least one arrangement direction.

10. The method of multi-beamforming according to claim 9, wherein each of the electromagnetic beams has a beam axis, and the beam axes are perpendicular to the at least one arrangement direction at the liquid crystal modulation structure.

11. The method of multi-beamforming according to claim 9, wherein when the amplitude interference pattern shows a plurality of first zones, a distance between adjacent two of the first zones is a zone spacing, and the tilt angle of each of the electromagnetic beams is inversely proportional to the zone spacing.

12. The method of multi-beamforming according to claim 11, wherein when the amplitude interference pattern shows a plurality of second zones, a distance between adjacent two of the second zones is the zone spacing.

13. The method of multi-beamforming according to claim 8, wherein each of the patch antenna units comprises two patch antennas, where an electric field direction of each of the patch antenna units is parallel to a central connecting line between the patch antennas, and phases of the feeding electromagnetic wave to the patch antennas are substantially identical;

when an AC voltage is applied to one or other of the patch antennas, each of the patch antenna units generates the first radiation intensity or the second radiation intensity; and when the patch antennas and the ground plane are substantially equipotential, each of the patch antenna units generates the zero-type third radiation intensity.

* * * * *